United States Patent
Shilliday et al.

(10) Patent No.: US 7,162,958 B2
(45) Date of Patent: Jan. 16, 2007

(54) DISTRIBUTED CHARGE INFLATOR SYSTEM

(75) Inventors: David Shilliday, Phoenix, AZ (US); Gregory J. Scaven, Mesa, AZ (US); Kevin Fitzgerald, Mesa, AZ (US)

(73) Assignee: Zodiac Automotive US Inc., Tempe, AZ (US)

( * ) Notice: Subject to any disclaimer, the term of this patent is extended or adjusted under 35 U.S.C. 154(b) by 21 days.

(21) Appl. No.: 10/224,435

(22) Filed: Aug. 21, 2002

(65) Prior Publication Data

US 2003/0213398 A1   Nov. 20, 2003

Related U.S. Application Data

(63) Continuation-in-part of application No. 10/146,933, filed on May 17, 2002, now Pat. No. 6,886,469.

(51) Int. Cl.
  *C06D 5/00* (2006.01)
(52) U.S. Cl. .................. 102/530; 280/741; 280/742
(58) Field of Classification Search ................ 102/530, 102/531; 280/736, 740, 741, 742, 737
See application file for complete search history.

(56) References Cited

U.S. PATENT DOCUMENTS

| | | | |
|---|---|---|---|
| 3,532,359 A | | 10/1970 | Teague et al. |
| 3,606,377 A | | 9/1971 | Martin |
| 3,698,183 A | * | 10/1972 | MacDonald et al. ....... 60/39.47 |
| 3,724,870 A | | 4/1973 | Kurokawa et al. |
| 3,776,570 A | | 12/1973 | Weman |
| 4,136,894 A | * | 1/1979 | Ono et al. ................. 280/729 |
| 4,139,404 A | | 2/1979 | Goddard et al. |

(Continued)

FOREIGN PATENT DOCUMENTS

DE   4126743   2/1993

(Continued)

OTHER PUBLICATIONS

Supplementary Search Report dated Apr. 6, 2006 in related EP 03 72 8935.

*Primary Examiner*—Peter M. Poon
*Assistant Examiner*—David J. Parsley
(74) *Attorney, Agent, or Firm*—Dean W. Russell; Kilpatrick Stockton LLP

(57) ABSTRACT

An inflator includes a distributed charge to be distributed within an inflatable component of an inflatable system and a housing. The housing includes a combustion chamber and a gas storage chamber. The combustion chamber includes an initiator and a gas propellant. The gas storage chamber includes an inert gas at a high pressure. The housing also includes a gas nozzle. The distributed charge is connected to the housing through the gas nozzle. The distributed charge may be mechanically joined to the housing by a ferrule. Upon receiving an electrical signal from a crash sensor or other activator, the initiator ignites the gas propellant in the combustion chamber. The hot gas and hot particles from the burning gas propellant and the initiator flow into the gas storage chamber and heat the compressed inert gas in the gas storage chamber. The heated, compressed gas in the gas storage chamber flows through the gas nozzle and ignites the distributed charge. Combustion of the distributed charge generates a high volume of gas and inflates an inflatable component of an inflatable system.

25 Claims, 5 Drawing Sheets

U.S. PATENT DOCUMENTS

| | | | |
|---|---|---|---|
| 4,164,513 A | 8/1979 | Goddard | |
| 4,200,615 A | 4/1980 | Hamilton et al. | |
| 4,722,551 A | 2/1988 | Adams | |
| 4,902,036 A * | 2/1990 | Zander et al. | 280/736 |
| 4,923,212 A | 5/1990 | Cuevas | |
| 4,950,458 A | 8/1990 | Cunningham | |
| 4,998,751 A | 3/1991 | Paxton et al. | |
| 5,066,039 A | 11/1991 | Masaaki et al. | |
| 5,078,422 A | 1/1992 | Hamilton et al. | |
| 5,101,729 A | 4/1992 | Noble et al. | |
| 5,125,684 A | 6/1992 | Cartwright | |
| 5,131,680 A | 7/1992 | Coultas et al. | |
| 5,219,178 A | 6/1993 | Kobari et al. | |
| 5,249,824 A * | 10/1993 | Swann et al. | 280/729 |
| 5,273,313 A | 12/1993 | Klober et al. | |
| 5,275,433 A | 1/1994 | Martin et al. | |
| 5,282,648 A | 2/1994 | Peterson | |
| 5,290,060 A | 3/1994 | Smith | |
| 5,299,828 A | 4/1994 | Nakajima et al. | |
| 5,322,322 A | 6/1994 | Bark et al. | |
| 5,346,254 A | 9/1994 | Esterberg | |
| 5,358,273 A | 10/1994 | Onishi et al. | |
| 5,364,127 A * | 11/1994 | Cuevas | 280/741 |
| 5,397,543 A | 3/1995 | Anderson | |
| 5,403,035 A | 4/1995 | Hamilton | |
| 5,406,889 A | 4/1995 | Letendre et al. | |
| 5,415,932 A | 5/1995 | Bishop et al. | |
| 5,423,570 A * | 6/1995 | Kort et al. | 280/736 |
| 5,433,147 A * | 7/1995 | Brede et al. | 102/202.2 |
| 5,435,594 A * | 7/1995 | Gille | 280/728.2 |
| 5,443,286 A | 8/1995 | Cunningham et al. | |
| 5,462,307 A | 10/1995 | Webber et al. | |
| 5,464,246 A | 11/1995 | Castro et al. | |
| 5,480,181 A | 1/1996 | Bark et al. | |
| 5,483,896 A | 1/1996 | Hock et al. | |
| 5,495,807 A | 3/1996 | Martin | |
| 5,496,062 A | 3/1996 | Rink et al. | |
| 5,520,413 A | 5/1996 | Mossi et al. | |
| 5,577,765 A * | 11/1996 | Takeda et al. | 280/729 |
| 5,588,676 A | 12/1996 | Clark et al. | |
| 5,609,210 A | 3/1997 | Galbraith et al. | |
| 5,613,706 A | 3/1997 | Parker et al. | |
| 5,623,115 A | 4/1997 | Lauritzen et al. | |
| 5,630,618 A | 5/1997 | Hamilton et al. | |
| 5,660,412 A | 8/1997 | Renfroe et al. | |
| 5,670,738 A | 9/1997 | Storey et al. | |
| 5,738,374 A | 4/1998 | Marsaud et al. | |
| 5,752,717 A | 5/1998 | Galbraith et al. | |
| 5,820,162 A * | 10/1998 | Fink | 280/742 |
| 5,829,779 A | 11/1998 | Nakashima et al. | |
| 5,839,754 A | 11/1998 | Schluter et al. | |
| 5,868,424 A | 2/1999 | Hamilton et al. | |
| 5,890,735 A * | 4/1999 | Smith | 280/737 |
| 5,918,900 A * | 7/1999 | Ennis | 280/736 |
| 5,927,748 A | 7/1999 | O'Driscoll | |
| 5,967,550 A | 10/1999 | Shirk et al. | |
| 5,970,880 A | 10/1999 | Perotto | |
| 6,019,389 A | 2/2000 | Burgi et al. | |
| 6,032,979 A | 3/2000 | Mossi et al. | |
| 6,062,143 A | 5/2000 | Grace et al. | |
| 6,066,017 A | 5/2000 | Max et al. | |
| 6,073,961 A | 6/2000 | Bailey et al. | |
| 6,079,740 A * | 6/2000 | Barth et al. | 280/737 |
| 6,095,559 A | 8/2000 | Smith et al. | |
| 6,106,010 A | 8/2000 | Forbes et al. | |
| 6,119,474 A | 9/2000 | Augustine et al. | |
| 6,123,790 A | 9/2000 | Lundstrom et al. | |
| 6,177,028 B1 | 1/2001 | Kanda et al. | |
| 6,227,562 B1 | 5/2001 | Shirk et al. | |
| 6,237,941 B1 | 5/2001 | Bailey et al. | |
| 6,237,950 B1 | 5/2001 | Cook et al. | |
| 6,253,683 B1 * | 7/2001 | Fukabori | 102/530 |
| 6,308,984 B1 | 10/2001 | Fischer | |
| 6,422,599 B1 * | 7/2002 | Oehm | 280/736 |
| 6,460,873 B1 * | 10/2002 | Lebaudy et al. | 280/728.1 |
| 6,612,243 B1 | 9/2003 | Italiane et al. | |
| 6,702,320 B1 | 3/2004 | Lang et al. | |
| 6,746,046 B1 * | 6/2004 | Rink et al. | 280/737 |
| 6,755,438 B1 | 6/2004 | Rink et al. | |
| 6,820,898 B1 * | 11/2004 | Dinsdale et al. | 280/737 |
| 6,854,764 B1 | 2/2005 | Larsen et al. | |
| 6,886,469 B1 | 5/2005 | Shilliday et al. | |
| 2003/0075904 A1 | 4/2003 | Lebaudy et al. | |
| 2003/0075909 A1 | 4/2003 | Lebaudy et al. | |
| 2004/0119272 A1 | 6/2004 | Rade et al. | |

FOREIGN PATENT DOCUMENTS

| | | | |
|---|---|---|---|
| DE | 4134995 | | 3/1993 |
| DE | 4211672 | | 10/1993 |
| DE | 20013405 | | 2/2001 |
| DE | 10040681 | | 9/2001 |
| EP | 0480085 | | 4/1992 |
| EP | 1069005 | | 1/2001 |
| EP | 00888932 | | 2/2001 |
| GB | 2303479 | A | 2/1997 |
| JP | 49-15082 | | 4/1974 |
| JP | 49-120332 | | 11/1974 |
| JP | 01151066 | | 6/1989 |
| JP | 1-269640 | | 10/1989 |
| JP | 1-273748 | | 11/1989 |
| JP | 2-81747 | | 3/1990 |
| JP | 6-24287 | | 2/1994 |
| JP | 8-156724 | | 6/1996 |
| JP | 8-198050 | | 8/1996 |
| JP | 9-30367 | | 2/1997 |
| JP | 9-100192 | | 4/1997 |
| JP | 9-124389 | | 5/1997 |
| WO | WO 94/01307 | * | 1/1994 |
| WO | WO 94/14637 | * | 1/1994 |
| WO | WO 96/40541 | | 12/1996 |
| WO | WO 97/20786 | | 6/1997 |
| WO | WO 99/12776 | A | 3/1999 |
| WO | 09938725 | | 8/1999 |
| WO | WO/ 01/12475 | | 2/2001 |
| WO | WO 01/34516 | A2 | 5/2001 |
| WO | WO 03/097382 | A2 | 11/2003 |
| WO | WO 2004/110825 | A1 | 12/2004 |

* cited by examiner

DISTRIBUTED CHARGE INFLATOR SYSTEM

This application is a continuation-in-part of U.S. patent application Ser. No. 10/146,933, filed May 17, 2002, now U.S. Pat. No. 6,886,469 which is herein incorporated by reference in its entirety.

FIELD OF THE INVENTION

The present invention relates generally to the field of gas-generating devices for inflatable systems, and particularly to those used in inflatable restraint systems.

BACKGROUND OF THE INVENTION

Conventional inflators for inflatable systems, such as airbags, use either a highly pressurized stored gas or a propellant material, typically an azide-based gas generating material, that chemically reacts in a combustion reaction to produce gases.

However, the use of a stored, pressurized gas in an inflator is generally uneconomic because the pressure vessels required to store the gas are bulky, heavy and expensive and the use of gas-generating propellants produces significant quantities of toxic gases, such as carbon monoxide, and/or flammable gases, such as hydrogen.

Hybrid inflators utilize a combination of stored gas and the products of combustion of pyrotechnic material to deploy an inflatable system. The gas is stored in a chamber at a relatively high pressure. The chamber where the gas is stored is adjacent to a combustion chamber that contains an initiator and a pyrotechnic material for producing hot combustion gases that are delivered to the stored gas. The mixture of the hot combustion gases and stored gases are delivered through an outlet to inflate an inflatable component. Hybrid inflators are particularly useful in that no azide is required in the inflatable system and that complex filters are not required to cool and clean the gases. Examples of hybrid inflators are disclosed in U.S. Pat. No. 5,670,738 (a hybrid inflator using compressed gas together with an initiator and a pyrotechnic gas generator), U.S. Pat. No. 5,660,412 (a hybrid inflator consisting of a pressure vessel containing a main charge of pyrotechnic material and a secondary charge of pyrotechnic material, wherein the secondary charge produces products of combustion that ignite the main charge), U.S. Pat. No. 5,588,676 (a hybrid inflator with a pyrotechnic gas generator and a gas chamber storing pressurized gas), U.S. Pat. No. 5,462,307 (a hybrid airbag inflator with a first chamber containing compressed gas and a second chamber containing an igniter and pyrotechnic material) and U.S. Pat. No. 5,131,680 (an inflator assembly which includes pyrotechnic material and a container of gas under pressure). Each of the above mentioned patent is incorporated herein by reference.

Distributed charge inflators generally include a distributed gas-generating material, that may have a faster burning center core ignition material surrounded by supplemental propellant, or use a homogenous mixture of ignition material and propellant, and also include an initiator (e.g., an electronic squib) used to ignite the gas generating material upon a signal from an initiating device. The fast burning gas generating material or "distributed charge" is designed to be installed within and distributed along the interior of the undeployed inflatable component itself. It is not necessary to contain the distributed charge within any type of exterior housing or assembly.

FIG. 1 shows a distributed charge inflator installed within an inflatable system disclosed in U.S. Pat. No. 6,062,143, which is assigned to the assignee of the present application and is incorporated herein by reference. As shown, inflatable system 4 includes a inflatable component 3 and a distributed charge inflator. The distributed charge inflator includes a distributed charge 14, a sheath 17 and an initiator 11. Distributed charge 14 is distributed within the inflatable component 3. Inflatable system 4 receives an electric signal from an activator 1 along a wire 2, when a crash sensor or other activator determines that the inflatable component must be deployed. Upon receiving a signal from a sensor, initiator 11 ignites distributed charge 14. The combustion of distributed charge 14 generates a gas and inflates an inflatable component 3.

Because the distributed charge is distributed, rather than confined to a small enclosed container or chamber as in the prior art systems listed above, it generates gases and releases the generated gases with far less explosive force than in the prior art systems. The distributed charge inflator system virtually eliminates the uneven inflations, pressure waves, and inertial effects of gases injected into the inflatable components from externally located gas generators. Also, the distributed charge inflator equipped inflatable restraints deploy less aggressively than existing systems because the energy of the expanding gases is essentially distributed uniformly throughout the inflatable structure during deployment.

Further, because the distributed charge is distributed internally within the inflatable component, there is no necessity to reinforce the inflatable fabric or bladder material against pressure, heat and high velocity particulates at the point at which gases would have been forcefully injected into the inflatable component from the gas generator external to the inflatable component.

The distributed charge inflator is not limited to simply propagating the rapid ignition of other materials, the burning of which then produces the quantities of gas necessary to inflate a given structure. The distributed charge inflator system is a complete, autonomously-operating inflation system.

Example of inflatable components which the distributed charge inflator can be used to inflate are described in U.S. Pat. No. 5,282,648 (body and head restraints); U.S. Pat. No. 5,322,322 (side impact head strike protection); U.S. Pat. No. 5,480,181 (side impact head strike protection); and U.S. Pat. No. 5,464,246 (tubular cushions), which are incorporated herein by reference, as well as automotive airbags and other inflatable products.

SUMMARY OF THE INVENTION

The present invention is an improved distributed charge inflator system that can be used in conjunction with a wide variety of inflatable systems such as inflatable restraint systems, inflatable flotation systems, or passive inflatable safety systems.

The inflator is typically activated by an electronic sensor (for example, by an electronic crash sensor when the inflatable component is an airbag or other safety equipment which must be deployed in the event of a crash). However, the inflator may also be activated, for example, by another type of automatic device, or it may be activated by a mechanical device such as a button or switch or handle which is pushed, switched or pulled, respectively, by a user to deploy the inflatable component. For example, deployment of a life raft may be activated automatically by a sensor detecting immersion of the life raft in water, or it may be activated by a user pulling a handle. The device (crash sensor, mechanical device, button, switch, handle, water sensor or other device) that activates the inflation of the system will be referred to herein as the "activator."

In an embodiment of the present invention, an inflator includes a distributed charge to be distributed within an inflatable component of an inflatable system and a housing. The housing includes a combustion chamber and a gas storage chamber. The combustion chamber includes an initiator and a gas propellant. The gas storage chamber includes an inert gas, such as argon, nitrogen or helium, at a high pressure. The housing also includes a gas nozzle. The gas storage chamber is in direct fluid communication with the distributed charge through the gas nozzle. The distributed charge may be mechanically joined to the housing by a ferrule.

Upon receiving an electrical signal from a crash sensor or other activator, the initiator ignites the gas propellant in the combustion chamber. The hot gas and hot particles from the burning gas propellant and the initiator flow into the gas storage chamber and heat the compressed inert gas in the gas storage chamber. The heated, compressed gas in the gas storage chamber flows through the gas nozzle and ignites the distributed charge. Combustion of the distributed charge generates a high volume of gas and inflates an inflatable component of an inflatable system.

In another embodiment of the present invention, an inflatable system includes an inflatable component with multiple inflatable chambers, a housing and multiple strands of distributed charge. Each of the multiple strands of distributed charge is distributed within each of the multiple inflatable chambers. The housing includes a combustion chamber and a gas storage chamber. The housing also includes a gas nozzle. The gas storage chamber is in direct fluid communication with the multiple strands of distributed charge through the gas nozzle. The multiple strands of distributed charge may be mechanically joined to the housing by a ferrule. Combustion of the each of the multiple strands of distributed charge generates a high volume of gas and inflates the each of the multiple inflatable chambers, thus forming an inflated component with multiple inflated chambers.

In another embodiment of the present invention, an inflator includes a distributed charge and a housing. The housing includes a combustion chamber and a gas storage chamber. The combustion chamber is in direct fluid communication with the distributed charge through a gas nozzle. Upon receiving an electrical signal from a crash sensor or other activator, an initiator ignites a gas propellant in the combustion chamber and the distributed charge. Combustion of the distributed charge and the gas propellant generates a high volume of gas and inflates an inflatable component of an inflatable system. Simultaneously, the ignited gas propellant heats a compressed gas in the gas storage chamber. The heated, compressed gas in the gas storage chamber flows into the combustion chamber. The heated, compressed gas then flows through the gas nozzle and sustains the inflation of the inflatable component.

In another embodiment of the present invention, an inflatable system includes multiple strands of distributed charge and an inflatable component including multiple inflatable chambers. Each of the multiple strands of distributed charge is distributed within each of the multiple inflatable chambers of the inflatable component. The multiple strands of distributed charge are in direct fluid communication with a combustion chamber of a housing. The housing also includes a gas storage chamber. Upon receiving an electrical signal from a crash sensor or other activator, the initiator ignites a gas propellant in the combustion chamber and the multiple strands of the distributed charge. Combustion of the each of the multiple strands of distributed charge generates a high volume of gas and inflates the each of the multiple inflatable chambers of the inflatable component. Simultaneously, the ignited gas propellant in the combustion chamber heats a compressed gas in the gas storage chamber. The heated, compressed gas in the gas storage chamber flows into the combustion chamber. The heated, compressed gas then flows through the gas nozzle and sustains the inflation of the each of the multiple inflatable chambers of the inflatable component.

DETAILED DESCRIPTION OF THE INVENTION

Reference will now be made in detail to the preferred embodiments of the present invention, examples of which are illustrated in the accompanying drawings.

Figure 1:
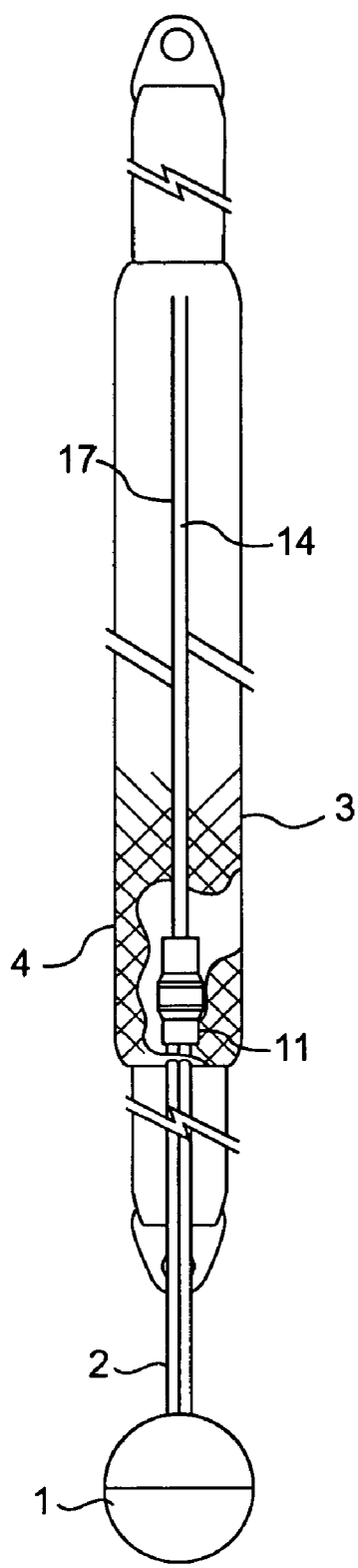
FIG. 1 is a schematic diagram of an inflatable system including an distributed charge inflator.
Figure 2:
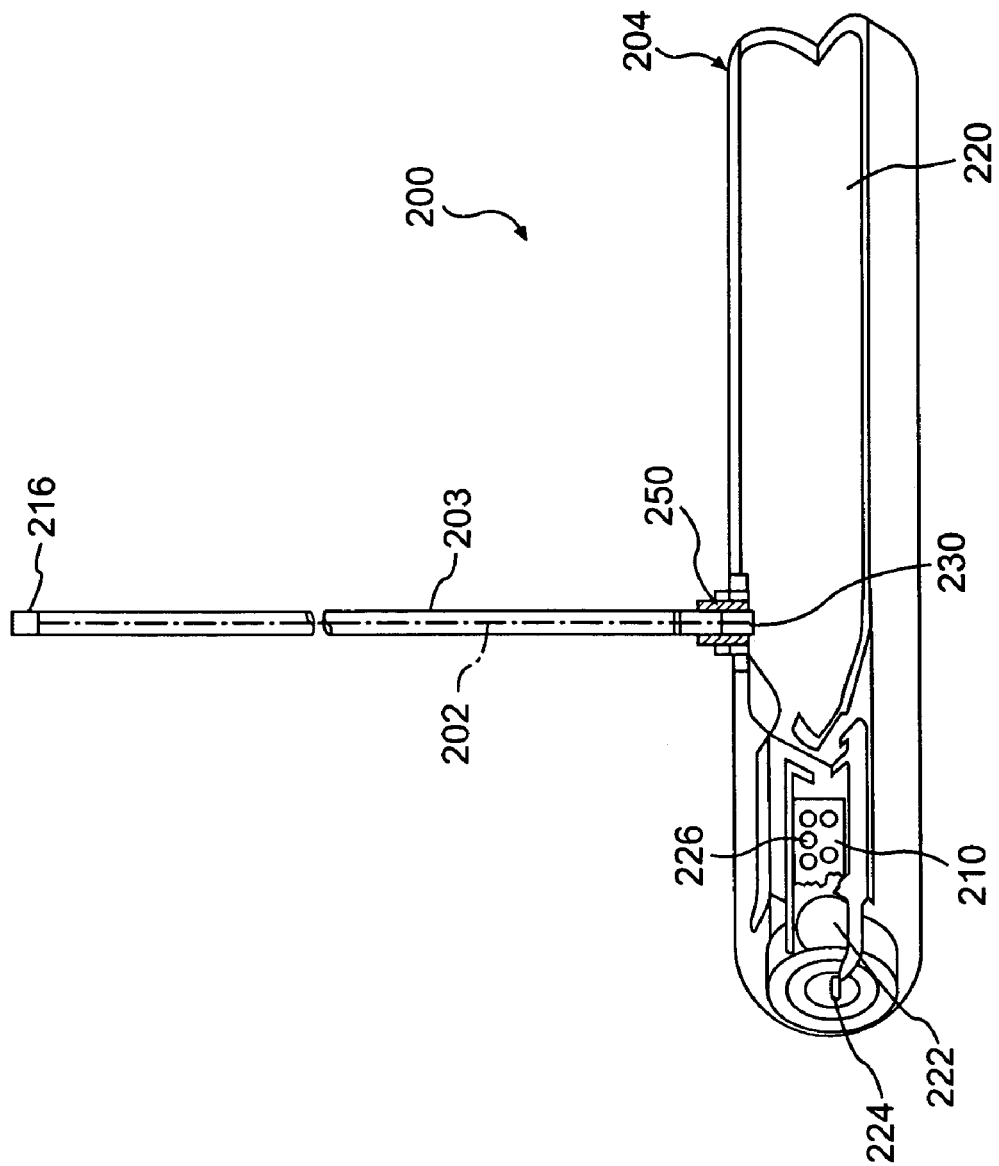
FIG. 2 is a schematic diagram of an inflator according to an embodiment of the present invention.

FIG. 2 shows an inflator according to a preferred embodiment of the present invention.

As shown, inflator 200 includes a distributed charge 202 and a housing 204. Distributed charge 202 is designed to be installed within and distributed along the interior of the undeployed inflatable component of an inflatable system. Housing 204 includes a combustion chamber 210 and a gas storage chamber 220. Combustion chamber 210 includes an initiator 222, connector pins 224 and a gas propellant 226. Initiator 222 may be an electronic squib, such as the electronic squib used to initiate deployment of an automotive airbag. Connector pins 224 are used to electrically connect inflator 200 to a crash sensor or other activator. Gas propellant 226 may be pyrotechnic materials, such as boron potassium nitrate ($BKNO_3$). Gas storage chamber 220 includes an inert gas, such as argon, nitrogen or helium, at pressure in the range of about 2000 to about 4000 psi. Housing 204 also includes a gas nozzle 230. Distributed charge 202 is connected to housing 204. Preferably, distributed charge 202 is connected to gas storage chamber 220 of housing 204 so that gas storage chamber 220 is in direct fluid communication with distributed charge 202 through gas nozzle 230. Distributed charge 202 may be mechanically joined to housing 204 by ferrule 250. Ferrule 250 also controls flow of the gas from gas storage chamber 220 to distributed charge 202.

Distributed charge 202 can be a solid monolithic rod of pyrotechnic materials formed into the desired configuration using binders. Optionally, distributed charge 202 can be enclosed in a sheath 203 (or layer or coating) for environmental protection. Inflator 200 can also include an end cap seal 216. End cap seal 216, for example, can be in the form of an o-ring, a gasket or other appropriate form which serves to seal against moisture and contamination. End cap seal 216 can be made of rubber, RTV and/or metals.

The distributed charge may be a mixture of ammonium, guadinium, and/or triaminoguadinium salts of decahydrodecaboric acid and inorganic oxidizers such as ammonium nitrate and/or potassium nitrate. Representative compositions include about 5% to about 30% by weight of the decahydrodecaborate salt and about 70% to about 90% by weight of the nitrate salt. The additional materials may be used to coat, wrap, tape, or sheath the base distributed charge prior to installation of the overall distributed charge inflator in an inflatable system. The distributed charge may be an ITLX which is a simple, extruded product for linear ignition.

Alternatively, the distributed charge can include a core of ignition material and a sheath. Optionally, distributed charge may include a gas generating layer or coating. Ignition material is a moldable, formable, or extrudable rapidly burning pyrotechnic material, such as hydroborate fuel with various nitrate oxidizers (e.g., Rapid Deflagrating Cord (RDC) manufactured by Teledyne McCormick-Selph, Inc.), or secondary explosives loaded into a metal sheath (e.g., Mild Detonating Fuse (MDF), also known as Low Energy Detonating Cord or LEDC, manufactured by the Ensign Bickford Company of Simsbury, Conn.), as disclosed in the U.S. Pat. No. 6,062,143, which is incorporated herein by reference.

Materials for the optional gas-generating layer or coating include alkali metal azides and organic azides with polymer binders, oxidizers, and metals used as the coating sheath or binder. For example, one possible composition for a particular application might be a mixture of about 20% to about 50% by weight sodium azide, about 25% to about 35% by weight of potassium nitrate, about 10% to about 15% by weight of a fluoroelastomer binder, and about 15% to about 25% by weight of magnesium.

Optionally, energetic propellants and explosives can also be added to the distributed charge composition or to the coating or wrapping. For example, butanetriol trinitrate (BTTN), pentaerythritol tetranitrate (PETN), cyclotrimethylene trinitramine (RDX), cycloteramethylene tetranitramine (HMX), metriol trinitrate (MTN), trinitrotoluene, nitroglycerine, or inorganic oxidizers, hexanitrostilbene (HNS), dipicramid (DIPAM), or inorganic oxidizers such as potassium nitrate, with metals such as magnesium can be used.

Polymer binders which may be used to bind the distributed charge include: fluoroelastomers, crosslinked polybutadiene rubber, crosslinked polyacrylic rubber, crosslinked polyurethane elastomers, and polyvinyl alcohol/acetate. Energetic or gas-generating polymers which may be employed in the distributed charge assembly include: glycidyl nitrate polymers, glycidyl azide polymer, polytetrazoles, polytriazoles, nitrocellulose, dinitropolystyrene, nitrated polybutadienes, and nitrated polyethers.

The environmentally-sealed sheath enclosing the distributed charge may be fabricated from ductile, easily extrudable metals such as tin (preferably) or silver, antimony or copper, or plastics such as polyethylene, polyurethane elastomer or fluoroelastomers. The sheath is designed to encapsulate and protect the energetic gas-generating materials to allow uniform vaporization or burning. The sheath splits open or vaporizes following the ignition of the distributed charge. The distributed charge, the gas generating layer, and the sheath can be formed into a wide variety of shapes and sizes to suit the specific application.

Inflator 200 receives an electric signal when a crash sensor or other activator determines that the inflatable component must be deployed. Upon receiving the electrical signal, initiator 222 ignites gas propellant 226 in combustion chamber 210. As pressure in combustion chamber 210 rises and exceeds the pressure of gas storage chamber 220, hot gas and hot particles from the burning gas propellant and the initiator flow into gas storage chamber 220. The hot gas and hot particles from combustion chamber 210 heat the compressed inert gas and cause a rapid pressure rise in gas storage chamber 220. The heated, compressed gas in gas storage chamber 220 flows through gas nozzle 230 and ignites distributed charge 202. Combustion of distributed charge 202 generates a high volume of gas which inflates an inflatable component of an inflatable system, such as an airbag.

The distributed charge may be manufactured in various sizes and configurations, depending upon the inflation requirements of the system for which it is intended. These may range from a foil or thin film, or linear or tubular shaped charges to broad flat sheets of distributed charge material which may be cut, trimmed, or otherwise fitted. The distributed charge material, whether in a linear or sheet form, may, in cross-section, be circular, wedge-shaped, diamond-shaped, "L" shaped, or formed in any number of other configurations. Because of this flexibility and the inherent simplicity of the invention, the distributed charge inflator is easier to install and less expensive to manufacture than gas generator systems currently in use.

The distributed charge inflator can be designed so that, depending on the pattern of distribution of the distributed charge within a given inflatable system, the rate at which different distributed charge sections are ignited, and the number or location of the electronic squib used to ignite the material, variable inflation rates and effective total gas volumes may be achieved. The materials used for the distributed charge should be flexible and pliable, such that they will not fracture or flow under normal operating conditions.

Figure 3:
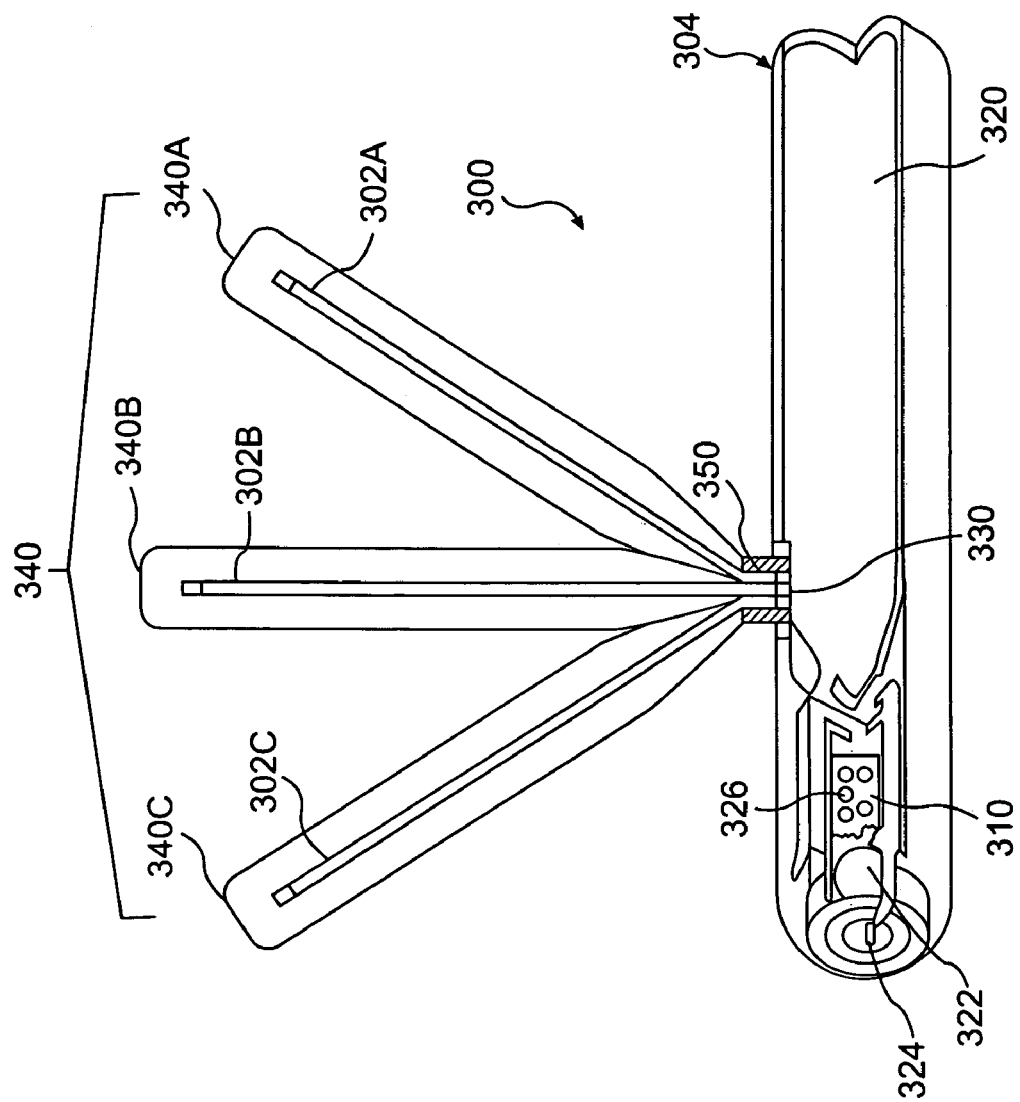
FIG. 3 is a schematic diagram of an inflatable system according to another embodiment of the present invention.

FIG. 3 shows an inflatable system according to another preferred embodiment of the present invention.

As shown, inflatable system 300 includes an inflatable component 340, a housing 304 and multiple strands of distributed charge 302A, 302B and 302C. Inflatable component 340 includes multiple inflatable chambers 340A, 340B and 340C. Each of the multiple strands of distributed charge 302A, 302B and 302C is distributed within each of the multiple inflatable chambers 340A, 340B and 340C, respectively. Housing 304 includes a combustion chamber 310 and a gas storage chamber 320. Combustion chamber 310 includes an initiator 322, connector pins 324 and a gas propellant 326. Gas storage chamber 320 includes an inert gas at a high pressure. Housing 304 also includes a gas nozzle 330. The multiple strands of distributed charge are connected to housing 304. Preferably, multiple strands of distributed charge are connected to gas storage chamber 320 of housing 304 so that gas storage chamber 320 is in direct fluid communication with the multiple strands of distributed charge through gas nozzle 330. The multiple strands of distributed charge maybe mechanically joined to housing 304 by a ferrule 350.

Upon receiving an electrical signal from a crash sensor or other activator, initiator 322 ignites gas propellant 326 in combustion chamber 310. The hot gas and hot particles from the burning gas propellant and the initiator flow into gas storage chamber 320 and heat the compressed inert gas in gas storage chamber 320. The heated, compressed gas in gas storage chamber 320 flows through gas nozzle 330 and ignites multiple strands of distributed charge 302A, 302B and 302C. Combustion of each of the multiple strands of distributed charge 302A, 302B and 302C generates a high volume of gas and inflates each of the multiple inflatable chamber 340C, 340B and 340C, respectively, thus forming an inflated component with multiple inflated chambers.

Figure 4:
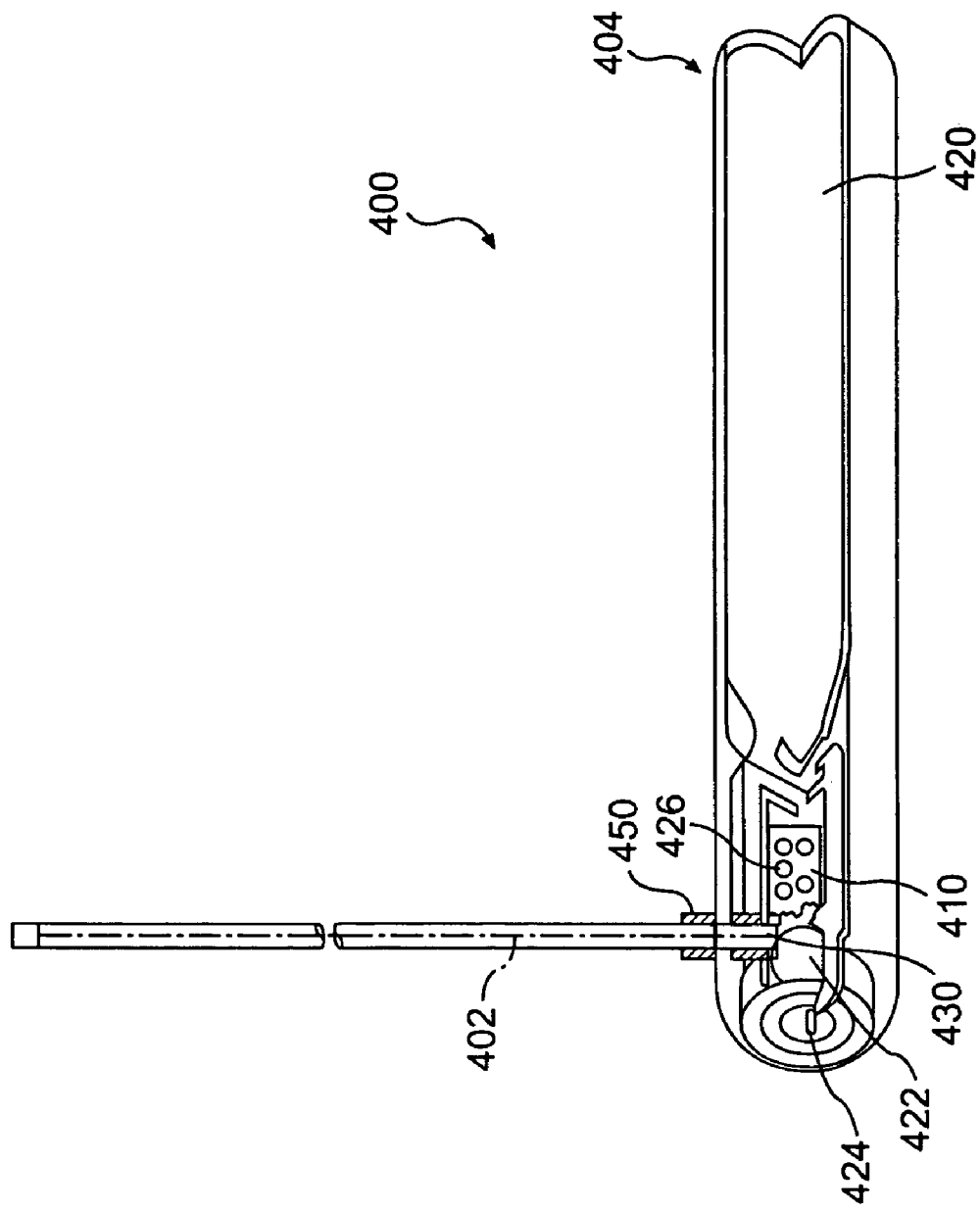
FIG. 4 is a schematic diagram of an inflator according to another embodiment of the present invention.

FIG. 4 shows an inflator according to another preferred embodiment of the present invention.

As shown, inflator 400 includes a housing 404 and a distributed charge 402. Housing 404 includes a combustion chamber 410 and a gas storage chamber 420. Combustion chamber 410 includes an initiator 422, connector pins 424 and a gas propellant 426. Gas storage chamber 420 includes an inert gas at a high pressure. Housing 404 also includes a gas nozzle 430. Distributed charge 402 is connected to housing 404. Preferably, distributed charge 402 is connected to combustion chamber 410 of housing 404 so that combustion chamber 410 is in direct fluid communication with distributed charge 402 through gas nozzle 430. Optionally, distributed charge 402 may be directly connected to initiator 422 in combustion chamber 410. Distributed charge 402 may be mechanically joined to housing 404 by a ferrule 450.

Upon receiving an electrical signal from a crash sensor or other activator, initiator 422 ignites gas propellant 426 in combustion chamber 410 and distributed charge 402, causing the inflation of an inflatable component, such as an airbag. Simultaneously, the hot gas and hot particles from the burning gas propellant and the initiator flow into gas storage chamber 420. The hot gas and hot particles from combustion chamber 410 heat the compressed inert gas and cause a rapid pressure rise in gas storage chamber 420. The heated, compressed gas in gas storage chamber 420 flows into combustion chamber 410 and through gas nozzle 430. The heated, compressed gas sustains the inflation of the inflatable component.

Figure 5:
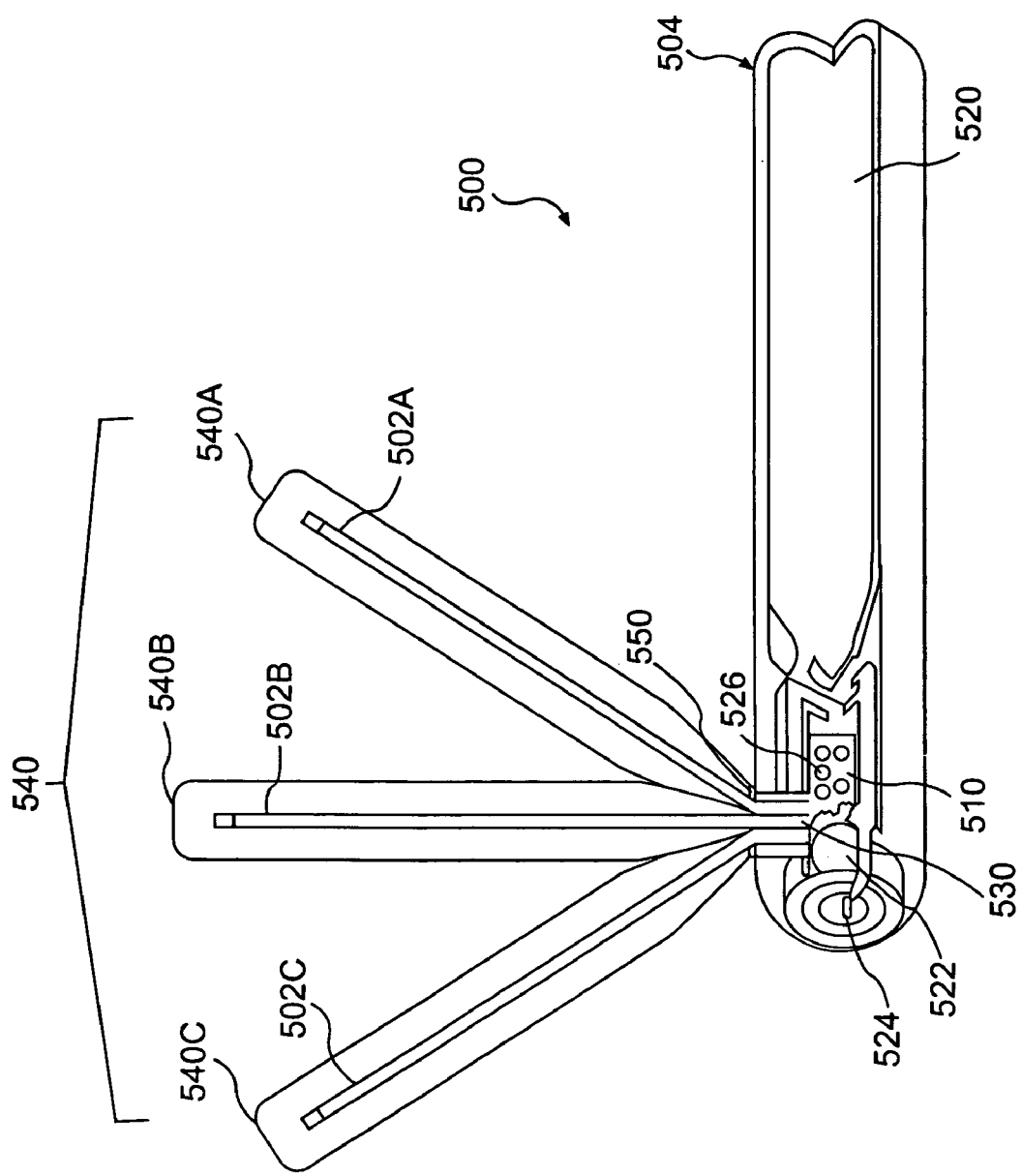
FIG. 5 is a schematic diagram of an inflatable system according to another embodiment of the present invention.

FIG. 5 shows an inflatable system according to yet another preferred embodiment of the present invention.

As shown, inflatable system 500 includes an inflatable component 540, a housing 504 and multiple strands of distributed charge 502A, 502B and 502C. Inflatable component 540 includes multiple inflatable chambers 540A, 540B and 540C. Each of the multiple strands of distributed charge 502A, 502B and 502C is distributed within each of the multiple inflatable chambers 540A, 540B and 540C, respectively. Housing 504 includes a combustion chamber 510 and a gas storage chamber 520. Combustion chamber 510 includes an initiator 522, connector pins 524 and a gas propellant 526. Gas storage chamber 520 includes an inert gas at a high pressure. Housing 504 also includes a gas nozzle 530. The multiple strands of distributed charge are connected to housing 504. Preferably, the multiple strands of distributed charge are connected to combustion chamber 510 of housing 504 so that combustion chamber 510 is in direct fluid communication with the multiple strands of distributed charge through the gas nozzle. Optionally, the multiple strands of distributed charge may be directly connected to initiator 522 in combustion chamber 510. Multiple strands of distributed charge 502A, 502B and 502C are mechanically joined to housing 504 by a ferrule 550. Upon receiving an electrical signal from a crash sensor or other activator, initiator 522 ignites gas propellant 526 in combustion chamber 510 and multiple strands of distributed charge 502A, 502B and 502C, thus forming an inflated component with multiple inflated chambers. Simultaneously, the hot gas and hot particles from the burning gas propellant and the initiator flow into gas storage chamber 520 and heat the compressed inert gas in gas storage chamber 520. The heated, compressed gas in gas storage chamber 520 flows into combustion chamber 510 and flows through gas nozzle 530. The heated, compressed gas from gas storage chamber 520 sustains the inflation of the multiple inflatable chambers.

The inflator in the present invention uses a distributed charge with a combination of pyrotechnic and stored gas. Alternatively, conventional compressed-gas inflator can be used with a distributed charge.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. An inflatable system comprising:
   a. an inflatable component; and
   b. means for inflating and sustaining inflation of the inflatable component, such means comprising:
      i. a non-inflatable housing distinct from but in fluid communication with the inflatable component, the housing comprising:
         A. a combustion chamber;
         B. a gas storage chamber in fluid communication with the combustion chamber; and
         C. a gas nozzle actuatable prior to inflation of the inflatable component;
      ii. an initiator disposed in the combustion chamber;
      iii. a gas propellant disposed in the combustion chamber;
      iv. a charge distributed within the inflatable component such that a substantial portion of the charge is disposed outside the housing, the charge generating inflating gas so as to provide initial inflation of the inflatable component; and
      v. a compressed gas, disposed in the gas storage chamber in fluid communication with the gas nozzle, for sustaining inflation of the inflatable component after its initial inflation.

2. The system of claim 1, wherein the charge is connected to the combustion chamber.

3. The system of claim 1, wherein the charge is connected to the gas storage chamber.

4. The system of claim 1, wherein the charge is connected to the initiator.

5. The system of claim 1, wherein the initiator ignites the gas propellant and the charge.

6. The system of claim 1, wherein the initiator ignites the gas propellant in the combustion chamber and the ignited gas propellant heats the compressed gas in the gas storage chamber.

7. The system of claim 6, wherein the heated compressed gas ignites the charge.

8. The system of claim 1, wherein the inflating and sustaining means further comprises a sheath enclosing the charge.

9. The system of claim 1, wherein the charge is made of a rod of one or more pyrotechnic materials.

10. The system of claim 1, wherein the inflating and sustaining means further comprises at least one additional charge distributed within the inflatable component.

11. The system of claim 10, wherein the at least one additional charge is connected to the combustion chamber.

12. The system of claim 10, wherein the at least one additional charge is connected to the gas storage chamber.

13. The system of claim 10, wherein the inflatable component comprises a plurality of inflatable chambers.

14. The system of claim 13, wherein the charge is distributed within one of the plurality of inflatable chambers and the at least one additional charge is distributed in another of the plurality of inflatable chambers.

15. The system of claim 1, wherein the inflating and sustaining means further comprises a ferrule mechanically joining the charge to the housing.

16. The system of claim 1, wherein the compressed gas is inert.

17. The system of claim 1, wherein the charge is distributed within the inflatable component prior to inflation of the inflatable component such that a substantial portion of the charge is disposed outside the housing prior to inflation of the inflatable component.

18. An inflatable system comprising:
   a. an inflatable component including a plurality of inflatable chambers; and
   b. means for generating inflating gas, such means comprising:
      i. a non-inflatable housing distinct from but in fluid communication with the inflatable component and including (A) an initiator and (B) a gas nozzle actuatable prior to inflation of the inflatable component; and
      ii. a plurality of charges (A) connected to the housing and (B) for generating inflating gas, each of the plurality of charges extending into and being distributed in a respective and different one of the plurality of inflatable chambers; and wherein (a) the housing comprises a first chamber including the initiator and a second chamber and (b) the gas generating means further comprises a compressed gas included in the second chamber in fluid communication with the gas nozzle.

19. The system of claim 18, wherein the plurality of charges are connected to the first chamber.

20. The system of claim 18, wherein the plurality of charges are connected to the second chamber.

21. The system of claim 18, wherein the plurality of charges are connected to the initiator.

22. The system of claim 18, wherein each of the plurality of charges extends into and is distributed in a respective and different one of the plurality of inflatable chambers prior to inflation thereof.

23. The system of claim 18, wherein the gas nozzle is in fluid communication with the plurality of charges.

24. An inflatable system comprising:
   a. an inflatable component; and
   b. means for inflating and sustaining inflation of the inflatable component, such means comprising:
      i. a non-inflatable housing distinct from but in fluid communication with the inflatable component, the housing comprising:
         A. a combustion chamber;
         B. a gas storage chamber in fluid communication with the combustion chamber; and
         C. a gas nozzle actuatable prior to inflation of the inflatable component;
      ii. an initiator disposed in the combustion chamber;
      iii. a gas propellant disposed in the combustion chamber;
      iv. a charge, in the form of a rod of one or more pyrotechnic materials, distributed within the inflatable component such that a substantial portion of the charge is disposed outside the housing, the charge generating inflating gas so as to provide initial inflation of the inflatable component;
      v. a sheath enclosing the charge;
      vi. a ferrule mechanically joining the charge to the housing; and
      vii. an inert compressed gas, disposed in the gas storage chamber in fluid communication with the gas nozzle, for sustaining inflation of the inflatable component after its initial inflation; and
   in which the initiator ignites the gas propellant in the combustion chamber, the ignited gas propellant heats the compressed gas in the gas storage chamber, and the heated compressed gas flows through the gas nozzle and ignites the charge.

25. An inflatable system comprising:
a. an inflatable component including a plurality of inflatable chambers; and
b. means for generating inflating gas, such means comprising:
   i. a non-inflatable housing distinct from but in fluid communication with the inflatable component and including (A) an initiator and (B) a gas nozzle actuatable prior to inflation of the inflatable component; and
   ii. a plurality of charges (A) connected to the housing, (B) in fluid communication with the gas nozzle, and (C) for generating inflating gas, each of the plurality of charges extending into and being distributed in a respective and different one of the plurality of inflatable chambers prior to inflation thereof; and wherein (a) the housing comprises a first chamber including the initiator and a second chamber and (b) the gas generating means further comprises a compressed gas included in the second chamber in fluid communication with the gas nozzle.

* * * * *